(12) United States Patent
Garde

(10) Patent No.: US 9,803,620 B2
(45) Date of Patent: Oct. 31, 2017

(54) PITCH SYSTEM FOR A WIND TURBINE

(71) Applicant: Vestas Wind Systems A/S, Aarhus N. (DK)

(72) Inventor: Erik Garde, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 582 days.

(21) Appl. No.: 14/369,920

(22) PCT Filed: Nov. 29, 2012

(86) PCT No.: PCT/DK2012/050437
§ 371 (c)(1),
(2) Date: Jun. 30, 2014

(87) PCT Pub. No.: WO2013/097851
PCT Pub. Date: Jul. 4, 2013

(65) Prior Publication Data
US 2014/0328681 A1     Nov. 6, 2014

Related U.S. Application Data

(60) Provisional application No. 61/581,653, filed on Dec. 30, 2011.

(51) Int. Cl.
*F01D 5/18*     (2006.01)
*F03D 7/02*     (2006.01)
*F03D 7/04*     (2006.01)

(52) U.S. Cl.
CPC ............. *F03D 7/0224* (2013.01); *F03D 7/04* (2013.01); *F05B 2260/30* (2013.01);
(Continued)

(58) Field of Classification Search
CPC ....... F03D 7/0224; F03D 7/0236; Y02E 10/723
(Continued)

(56) References Cited

U.S. PATENT DOCUMENTS 4,936,746 A * 6/1990 Mayo .................... B64C 11/306
416/128
6,604,907 B1 * 8/2003 Lehnhoff .............. F03D 7/0224
416/156
(Continued)

FOREIGN PATENT DOCUMENTS

| DE | 19948997 A1 | 4/2001 |
| EP | 1647708 A1 | 4/2006 |
| EP | 2253841 A2 | 11/2010 |

OTHER PUBLICATIONS

International Searching Authority, International Search Report and Written Opinion issued in corresponding PCT Application No. PCT/DK2012/050437 dated Feb. 11, 2013, 10 pages.

*Primary Examiner* — Craig Kim
*Assistant Examiner* — Jason Mikus
(74) *Attorney, Agent, or Firm* — Wood Herron & Evans LLP

(57) ABSTRACT

A wind turbine comprises a hub, a blade rotatably mounted to the hub, and a pitch system. The pitch system includes a support, a first drive configured to rotate the blade relative to the support, a second drive configured to rotate the support relative to the hub. The support is configured to be selectively fixed relative to the blade and the hub such that the first or second drive may be used to pitch the blade. A method of pitch corresponding to this operation is provided.

8 Claims, 9 Drawing Sheets

(52) U.S. Cl.
CPC ....... *F05B 2260/74* (2013.01); *F05B 2260/76* (2013.01); *F05B 2260/79* (2013.01); *F05B 2270/107* (2013.01); *F05B 2270/602* (2013.01); *F05B 2270/604* (2013.01); *Y02E 10/723* (2013.01)

(58) Field of Classification Search
USPC .......................................................... 416/1
See application file for complete search history.

(56) References Cited

U.S. PATENT DOCUMENTS

2010/0230977 A1* 9/2010 Patel .................... F03D 9/25
290/1 C
2011/0044813 A1* 2/2011 Lindberg ............. F03D 7/0224
416/1

* cited by examiner

PITCH SYSTEM FOR A WIND TURBINE

TECHNICAL FIELD

This invention relates to a pitch system for a wind turbine, along with a method of pitching a blade of a wind turbine.

BACKGROUND

Wind turbines typically include a rotor with large blades driven by the wind. The blades convert the kinetic energy of the wind into rotational mechanical energy. The mechanical energy is typically transferred via drive train to a generator, which then converts the energy into electrical power.

Most modern wind turbines control power output by pitching the blades relative to the wind. Each blade is mounted to a hub by a respective blade bearing that allows relative movement between the blade and the hub. The blades are each rotated about its longitudinal axis by a pitch system that includes one or more electrical drives (e.g., electrical motors) or hydraulic drives (e.g., hydraulic actuators). Although a single drive may be used to collectively pitch the blades, the pitch systems in most modern, multi-megawatt wind turbines include separate drives for pitching each blade individually.

There are advantages and disadvantages associated with both hydraulic pitch systems and electrical pitch systems. Regardless of which type of system is used, the primary objective is to quickly and accurately control the rotation of the blade about its longitudinal axis. Most of the rotation occurs over a narrow range during power production. Small, cyclical movements characterize this rotation. However, there are times when a blade must be quickly pitched over a much larger range, such as when the blades must be pitched to a "stop" position. Optimizing a pitch system for both of these situations presents a challenge. Moreover, to ensure that pitching to a stop position can occur when there is a loss of power, pitch systems must include a back-up power supply. This presents a further design challenge no matter which type of pitch system is used.

SUMMARY

A wind turbine comprises a hub, a blade rotatably mounted to the hub, and a pitch system. The pitch system includes a support, a first drive configured to rotate the blade relative to the support, a second drive configured to rotate the support relative to the hub. The support is configured to be selectively fixed relative to the blade and the hub such that the first or second drive may be used to pitch the blade.

By providing two different drives for pitching the blade, each drive may be optimized for a particular purpose. For example, the first drive may be optimized for the small and frequent angular movements that are typically characteristic of operation during normal power production. The second drive may be optimized for larger, less-frequent angular movements, such as those characteristic of operation during shut-down procedures. The first and second drives are conveniently provided by arranging them in relation to the movable support. In other words, the arrangement with the movable support facilitates the incorporation of different drives. Moreover, such an arrangement does not require significantly different interfaces than existing pitch systems and is therefore relatively simple to implement. The arrangement also represents a low-cost solution because of its simplified design and ability to be easily manufactured.

One of the first and second drives may be externally-powered (i.e., powered by a source of energy not provided by the wind turbine). The other of the first and second drives may be internally-powered (i.e., powered by stored energy). The externally-powered drive may be configured to charge the internally-powered drive. Thus, once charged, the internally-powered drive provides a reliable backup to the externally-powered drive. Even if power to the externally-powered drive is lost, the internally-powered drive may be used to bring the wind turbine to a stop to prevent damage and thereafter allow maintenance.

Particular advantages are obtained when the first drive comprises an electric motor and the second drive comprises a hydraulic actuator. Normally electrical pitch systems require a back-up power source (e.g., battery or capacitor) that must be replaced every few years to ensure reliable and fail-safe operation. By providing a hydraulic actuator in addition to an electrical motor, the need for a back-up for the electrical motor is essentially eliminated. Furthermore, when the hydraulic actuator is charged by the electric motor, the need for a pump to pressurize hydraulic fluid is reduced or eliminated. The hydraulic actuator may act as a spring which may be "triggered" to pitch the blades, and then subsequently "re-armed" by the electrical motor. Thus, an electrical and hydraulic pitch system is provided without the components that typically drive up the costs of these systems (e.g., back-up battery for electrical pitch system and pump for hydraulic pitch system). These and other advantages will be more apparent based on the description below.

A corresponding method of pitching a blade of a wind turbine is also disclosed. Thus, the method generally comprises fixing a support relative to the hub. A first drive is then operated to rotate the blade relative to the support and hub. The method then comprises: a) releasing the relative fixation between the support and the hub, and b) fixing the support relative to the blade. The second drive is then operated to rotate the support and blade relative to the hub.

The method may further include steps related to charging the second drive. In such embodiments the method further involves fixing the blade relative to the hub and releasing the relative fixation between the support and the blade. The first drive is then operated to move the support relative to the blade and hub. This movement charges the second drive.

DETAILED DESCRIPTION

Figure 1:
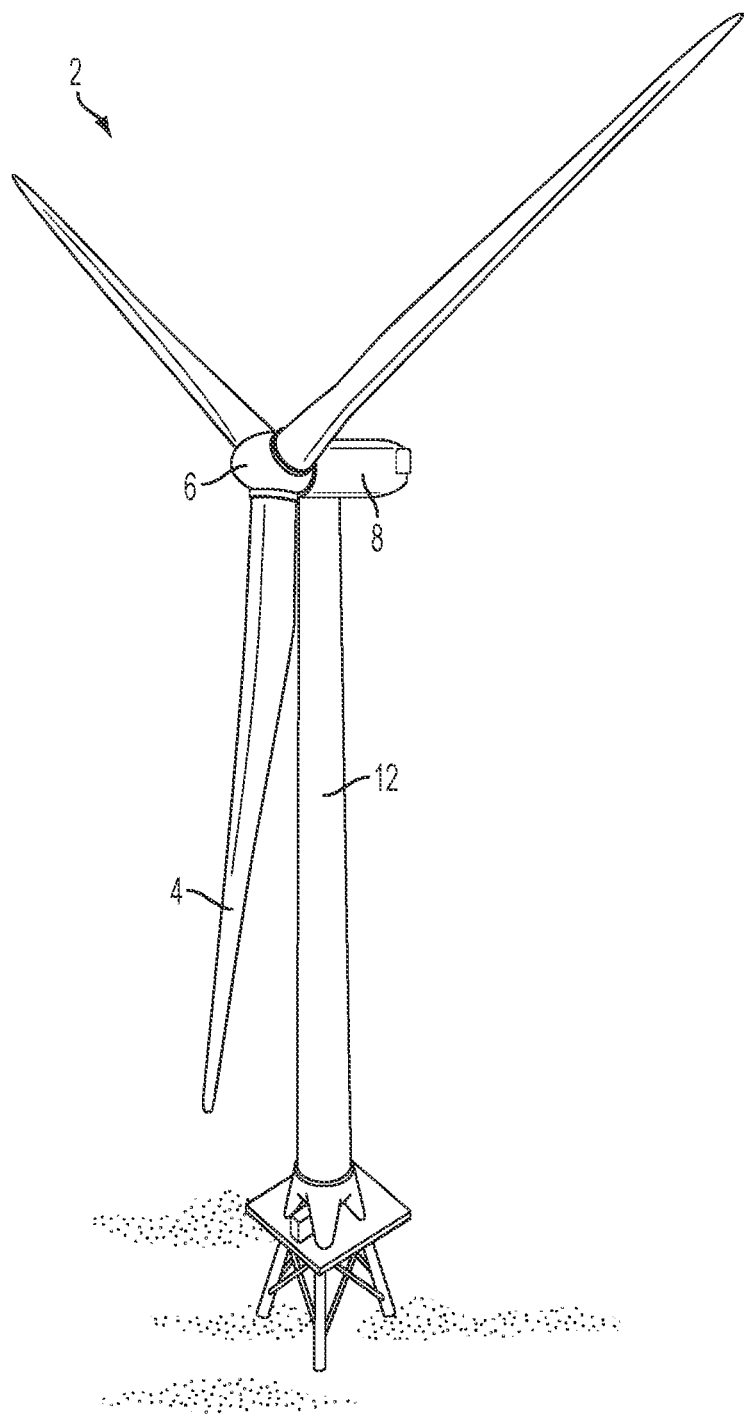
FIG. 1 is a perspective view of a wind turbine according to one embodiment.

FIG. 1 shows one example of a wind turbine 2. Although an offshore wind turbine is shown, it should be noted that the description below may be applicable to other types of wind turbines. The wind turbine 2 includes a rotor having blades 4 mounted to a hub 6, which is supported by a nacelle 8 on a tower 12. Wind causes the rotor to rotate about a main axis. This rotational energy is delivered to a power transmission system housed within the nacelle 8, where the energy is then converted into electrical power.

The blades 4 are mounted to the hub 6 by respective blade bearings so that the blades 4 can be pitched into or out of the wind. Pitching changes the amount of lift created by the wind and driving the rotation of the rotor. Thus, pitch systems between the blades 4 and hub 6 may be used to help control the wind turbine 2 and optimize power production. Although pitch systems are well-known, the description below focuses on a pitch system having a particular arrangement so that certain advantages may be obtained. These advantages will be more apparent based on the description below.

Figure 2:
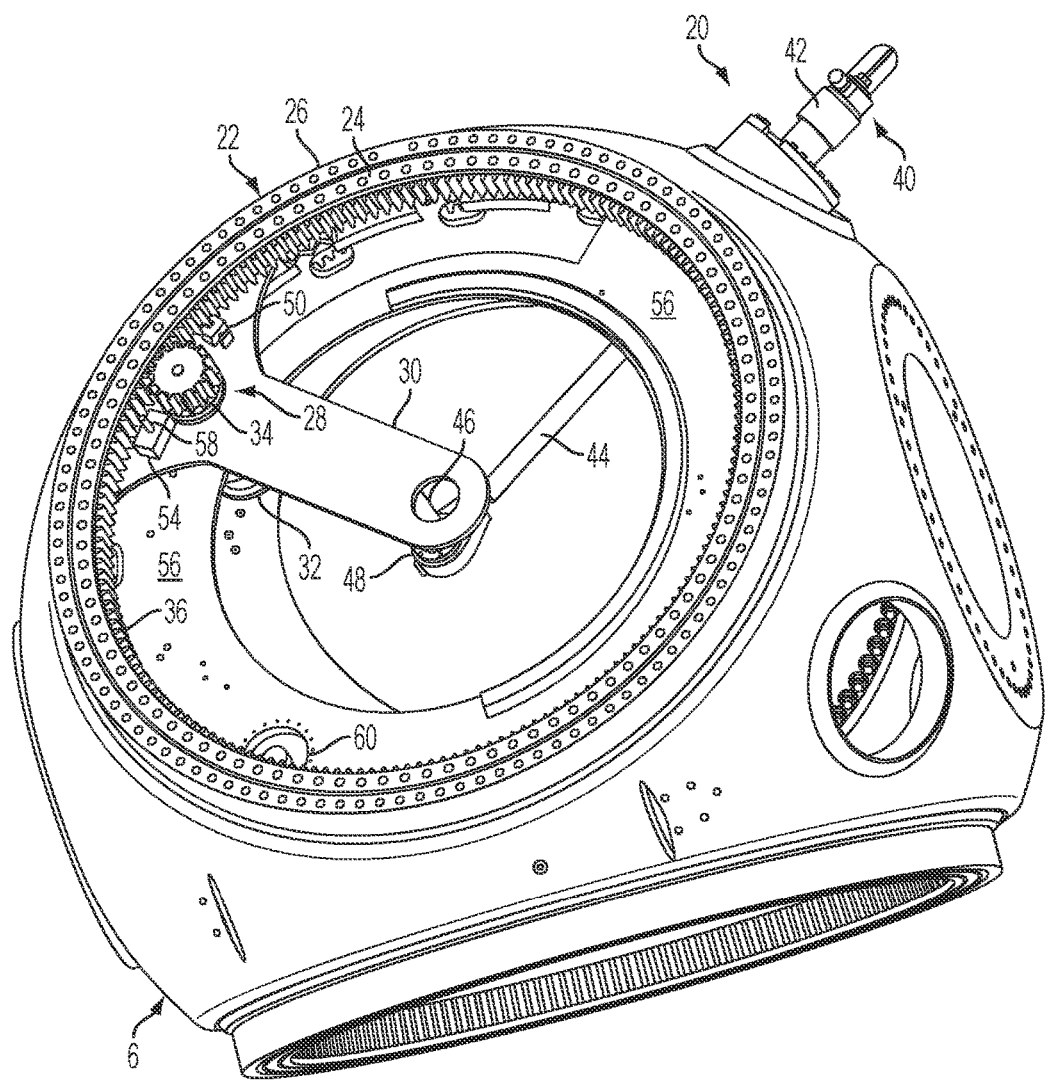
FIG. 2 is a perspective view of a hub of the wind turbine shown in FIG. 1.
Figure 3:
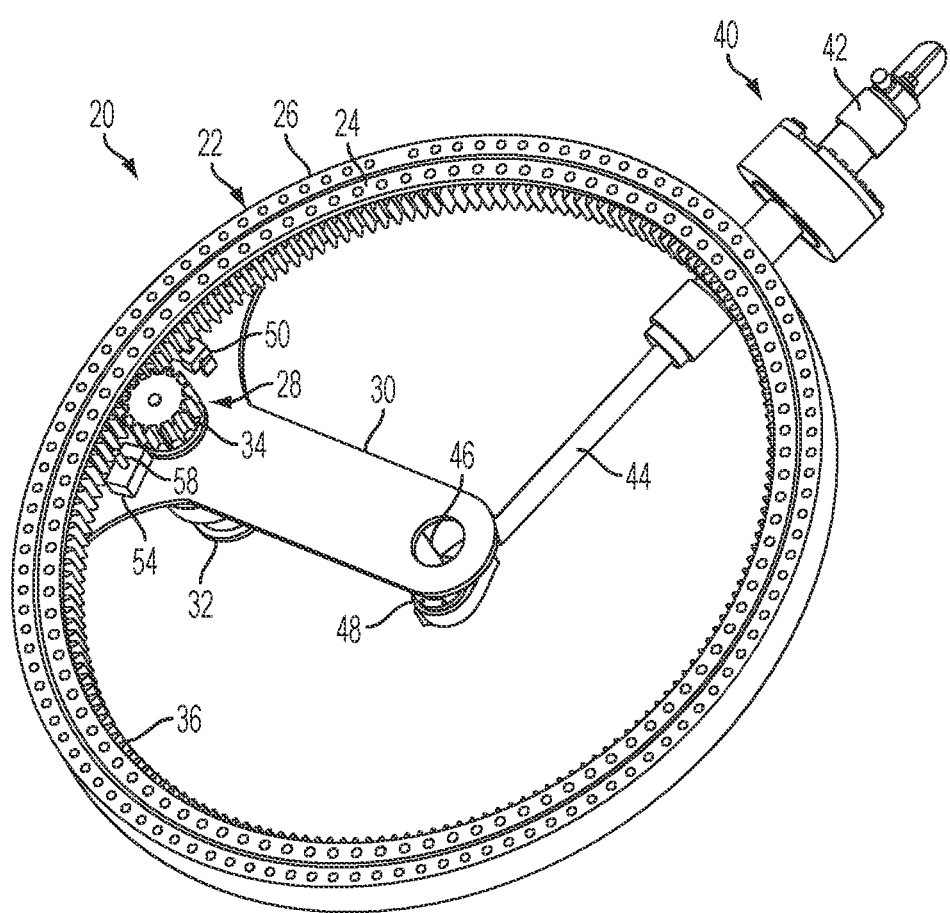
FIG. 3 is perspective view of a pitch system shown in FIG. 2.

In FIG. 1, the hub 6 is shown with an outer cover ("spinner"). FIG. 2, however, illustrates the hub 6 with the outer cover and several internal components removed so that a pitch system 20 for one of the blades can be seen in further detail. Similar pitch systems may be provided for each of the blades. As shown in FIGS. 2 and 3, the pitch system 20 includes a bearing 22 having an inner bearing ring 24 mounted to the blade (not shown) an outer bearing ring 26 mounted to the hub 6. A first drive 28 is configured to rotate the inner bearing ring 24 (and, therefore, blade) relative to a support 30. The first drive 28 in the embodiment shown comprises an electric motor 32 mounted to the support 30 and a pinion 34 driven by the electric motor 32. The pinion 34 engages a pitch gear 36 ("toothed ring") coupled to the inner bearing ring 24.

The pitch system 20 also includes a second drive 40 configured to rotate the support 30 relative to the hub 6. The second drive 40 in the embodiment shown comprises a hydraulic actuator having a cylinder 42 mounted to the hub 6 and a piston rod 44 coupled to the support 30. More specifically, the piston rod 44 is coupled to the support 30 by an axle 46 that is fixed to the support 30 at one end and received in a bearing 48 of the piston rod 44 at another end. Extending or retracting the piston rod 44 relative to the cylinder 42 rotates the support 30 relative to the hub 6.

The support 30 is configured to be selectively fixed to the blade and the hub 6. In other words, the support 30 can be "locked" in position relative to either the blade or the hub 6. This allows either of the first and second drives 28, 40 to be used alone to pitch the blade. For example, if the support 30 is locked relative to the blade, operating the second drive 40 to rotate the support 30 relative to the hub 6 results in the blade rotating relative to the hub 6 as well. If the support 30 is instead locked relative to the hub 6, operating the first drive 28 results in the blade rotating relative to both the support 30 and hub 6. These aspects will be described in further detail below.

Persons skilled in the design of wind turbine pitch systems will appreciate various ways in which the locking may be achieved. To fix the support 30 relative to the blade, the first drive 28 itself may be locked such that it does not permit relative rotation. For example, the electric motor 32 in the embodiment shown may apply a braking force that does not allow the pinion 34 to rotate. The engagement between the pinion 34 and toothed ring 36 then prevents relative movement between the support 30 and inner bearing ring 24; they remain in fixed positions relative to each other. Alternatively or additionally, a movable lock 50 may be provided on the support 30. The movable lock 50 is normally spaced from the toothed ring 36, but may be activated by a control system to move radially toward and engage the toothed ring 36. The engagement then prevents relative movement between the support 30 and the inner bearing ring 24.

To lock the support 30 relative to the hub 6, the second drive 40 itself may be locked such that it does not permit relative movement. For example, chambers of the cylinder 42 may remain equally pressurized with fluid (e.g., gas or liquid) to prevent the piston rod 44 from extending or retracting. The support 30 is then no longer able to move relative to the hub 6; they remain in fixed positions relative to each other. Alternatively or additionally, a movable lock 54 may be provided on the support 30 for this purpose. The movable lock 54 is configured to operatively engage the hub 6 when activated. In the embodiment shown, the engagement is via a plate 56 secured to the outer bearing ring 26 and hub 6. The plate 56 extends radially inward, under the inner bearing ring 24 and support 30. The movable lock 54 includes a pin 58 that moves downward from the support 30 into a hole or some other locking element on the plate 56 that prevents relative rotation. Locking elements may be provided at multiple locations on the plate 56 for reasons that will be discussed below.

Again, persons skilled in the design of wind turbine pitch systems will appreciate other ways of fixing the support 30 relative to the blade and hub 6. The movable locks 50, 54 shown in the figures are merely examples of one possible arrangement. In an alternative embodiment not shown, for example, the pitch system 20 may not include the plate 56. The movable lock 54 may then be on an underside (i.e., hub-side) surface of the support 30 and normally spaced from hub 6. When activated, such a movable lock may extend radially outward, under the inner bearing ring 24, to engage a slot or some other locking element on the hub 6 that prevents relative rotation.

In addition to selectively fixing the support 30 relative to the blade and the hub, the pitch system 20 may be configured to provide relative fixation between the blade and hub themselves. A conventional blade lock (or "pitch lock") may be used for this purpose and, therefore, is not illustrated in the figures. The blade lock is coupled to the blade and configured to operatively engage the hub 6 to prevent relative movement between the blade and the hub 6. The engagement may be via the plate 56. Thus, although the blade lock is not illustrated, a representative locking area 60 is shown in FIG. 2 to facilitate understanding. The blade lock is configured to engage the locking area 60 or some other locking element secured to the locking area 60.

Figure 4:
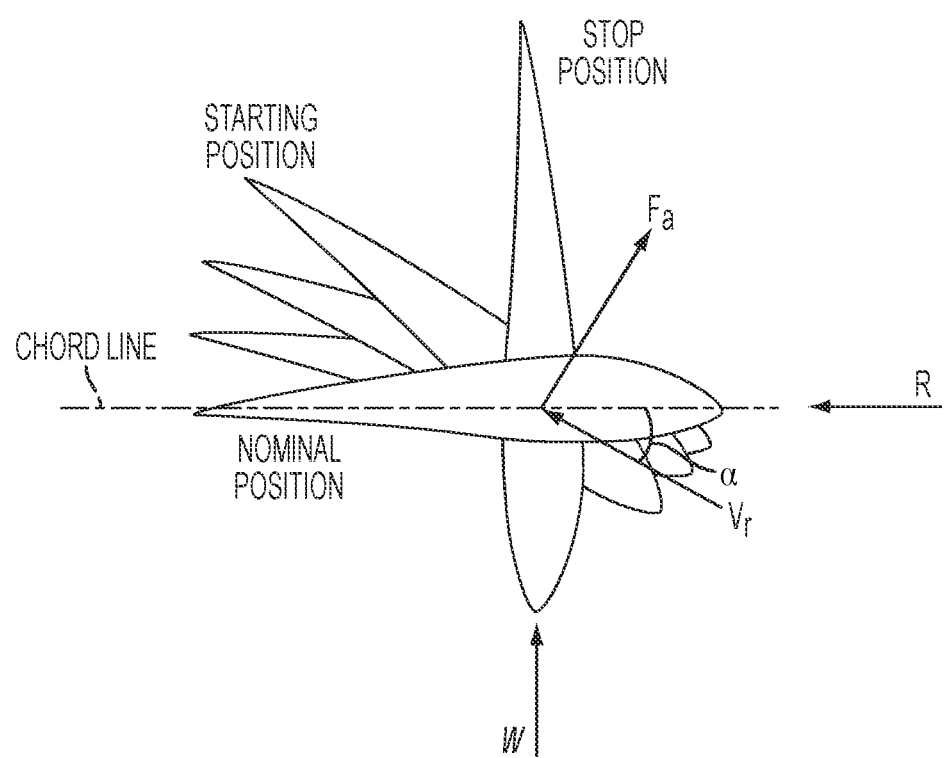
FIG. 4 is a schematic view of an airfoil cross-section.

A method of operating the pitch system 20 will now be described. First, by way of background and with reference to FIG. 4, the blades have nominal positions in which a representative airfoil cross-section (i.e., blade element) has a chord line generally aligned with the direction of rotation of the rotor. The blade pitch angle is said to be 0° in this orientation, and the moving air speed experienced by the blade is represented by R. The presence of wind W results in a relative flow velocity $v_r$ that defines an angle of attack α with the chord line and creates an aerodynamic force $F_a$. As the blade pitch angle is adjusted, the angle attack α is changed thereby affecting the aerodynamic force $F_a$. To stop the wind turbine, the blades are rotated relative to the hub (e.g., to a blade pitch angle of approximately 88-90°) so that the chord line is aligned or substantially aligned with the wind direction. There is then little to no aerodynamic force $F_a$, as the angle of attack α is approximately 0°. To start the wind turbine, the blades a rotated back toward their nominal position. This may be done in steps, such as by rotating the blades to a starting position, allowing the rotor to gain speed, and then resuming the blade rotation toward the nominal position to steadily increase power production.

FIGS. 5A-5E are schematic representations of the pitch system 20 at various stages of operation. As can be seen, the second drive 40 includes the cylinder 42 and piston rod 44. The piston rod 44 is actually part of a piston 70 that slides relative to cylinder 42. A plunger 72 of the piston 70 divides the cylinder 42 into first and second chambers 74, 76. The piston rod 44 extends from the plunger 72, through the first chamber 74, and out of the cylinder 42. Compressible fluids (e.g., liquids or gases) are provided in each of the first and second chambers 74, 76. For example, hydraulic oil may be provided in the first chamber 74 and gas may be provided in the second chamber 76. When both the first and second chambers 74, 76 are equally pressurized, the piston 72 does not move relative to the cylinder 42. The pressurization is therefore controlled by a hydraulic circuit communicating with one or both of the first and second chambers 74, 76. A sample hydraulic circuit 80 is represented in the figures.

The hydraulic circuit 80 includes a line 82 from the first chamber 74 to an accumulator 84. A control valve 86 is arranged in the line 82 for controlling the flow of fluid into and out of first chamber 74. The control valve 86, which may be operated by a battery 78, is normally open such that it must be activated to close the line 82 and prevent fluid flow. A one-way check valve 88 may also be provided in parallel with the control valve 86. Additionally, the hydraulic circuit 80 may include a flow restricting element 90 for reasons which will become more apparent.

Figure 5A:
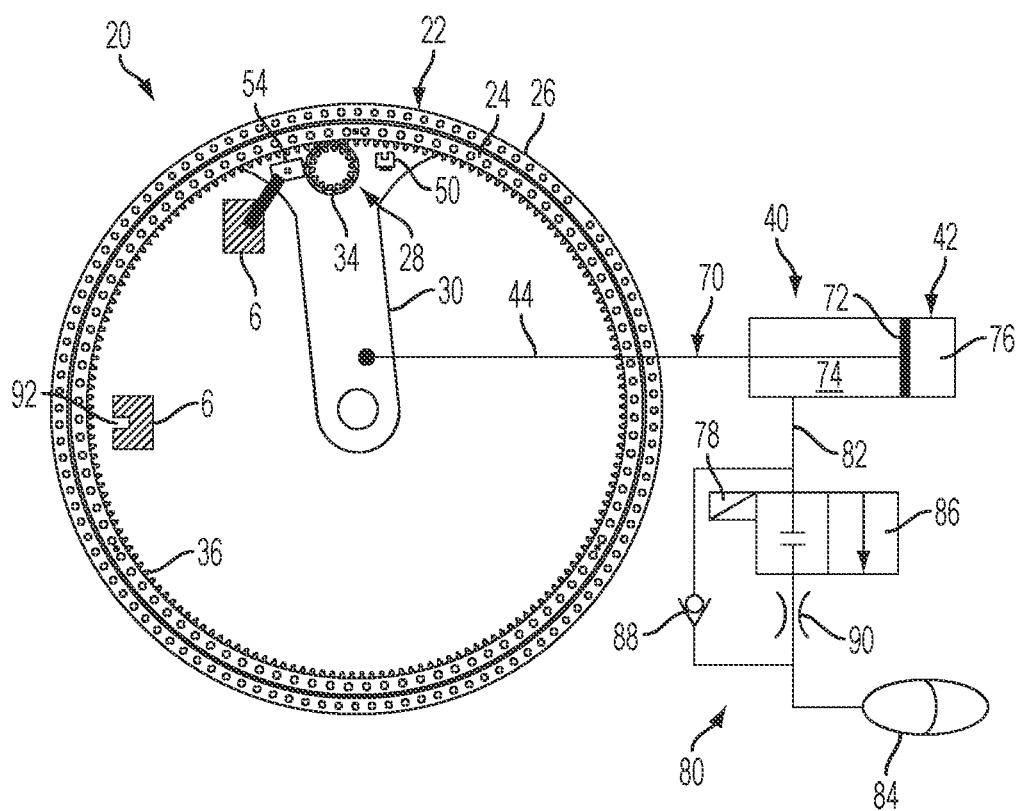
FIGS. 5A-5E are schematic views illustrating a method of operating the pitch system.

Now referring specifically to FIG. 5A, the pitch system 20 is shown in a first state of operation where the support 30 is fixed relative to the hub 6 by the movable lock 54. The blade lock (represented by number 92 in the drawing) and movable lock 50 are disengaged such that the inner bearing ring 24 and blade are free to rotate relative to the outer bearing ring 26, hub 6, and support 30. Accordingly, the first drive 28 (electric motor 32 and pinion 34 in this embodiment) may be operated to provide this relative rotation and thereby pitch the blade.

Figure 5B:
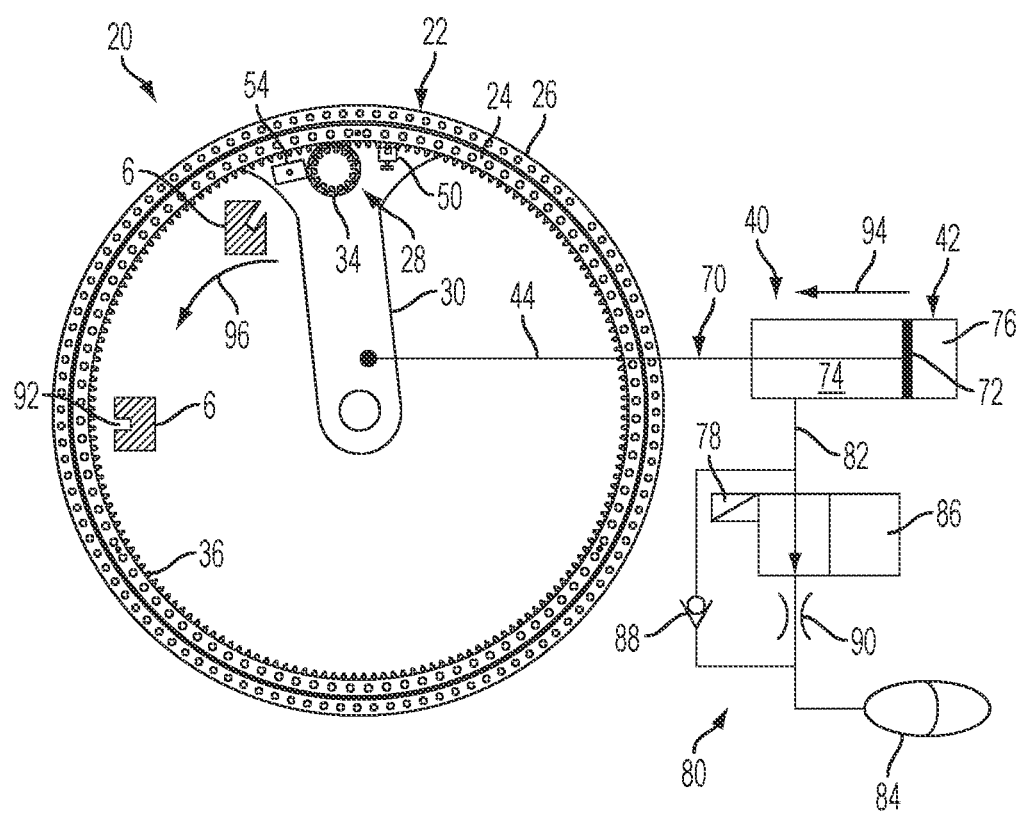

It may be necessary to quickly pitch the blade to a stop position if wind speeds exceed design limits, if power to the grid is lost, if service or maintenance is required, or for some other reason. As shown in FIG. 5B, the movable lock 54 disengages the hub 6 to release the relative fixation between the hub 6 and support 30. The movable lock 50, on the other hand, engages the toothed ring 36 to fix the support 30 relative to the inner bearing ring 24 and blade. The second drive 40 may then be operated to rotate the support 30, inner bearing ring 24, and blade relative to the outer bearing ring 26 and hub 6. In particular, the control valve 86 is deactivated (i.e., powered-off), allowing it to return to its normally-open position. The pressurized fluid in the second chamber 76 of the cylinder 42 then drives the piston 70 forward because pressure is relieved from the first chamber 74. Fluid in the first chamber 74 flows through the control valve 86 to the accumulator 84. A flow restricting element 90 (throttle valve, nozzle, orifice, etc.) may be positioned in the hydraulic circuit 80 to control this flow of fluid and—as a result—the speed at which the piston 70 is driven forward. The linear movement of the piston 70 (represented by arrow 94) causes the support 30 to rotate (represented by arrow 96).

Figure 5C:
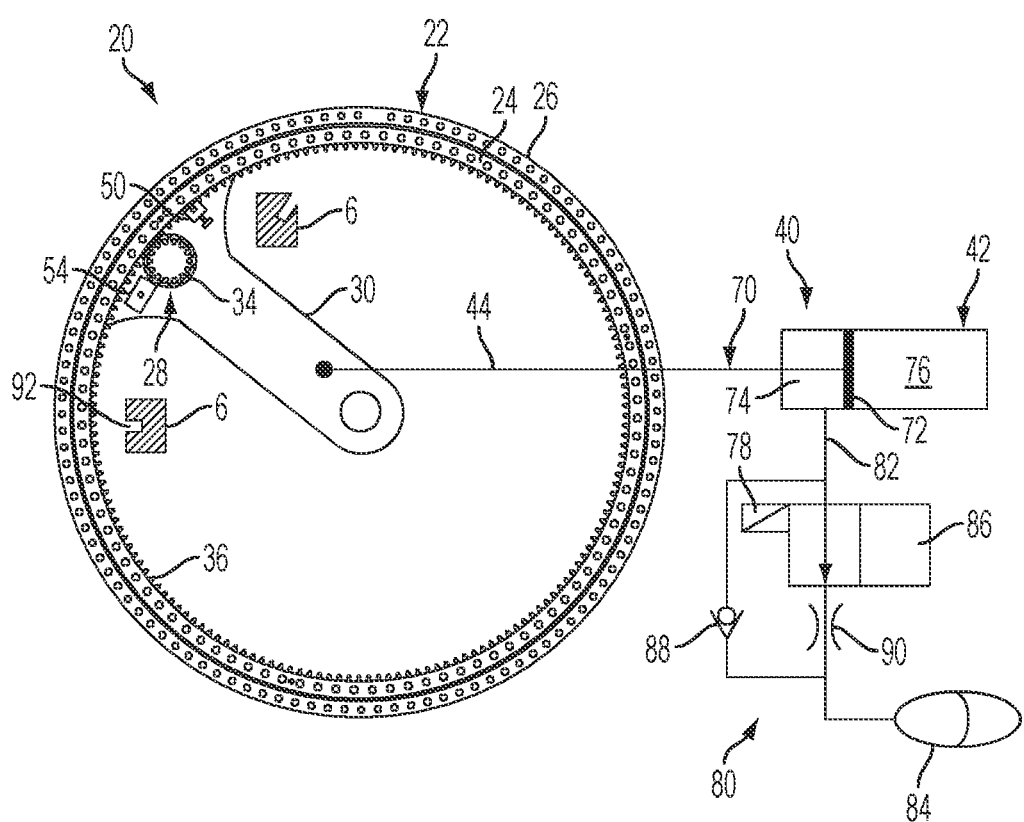
Figure 5D:
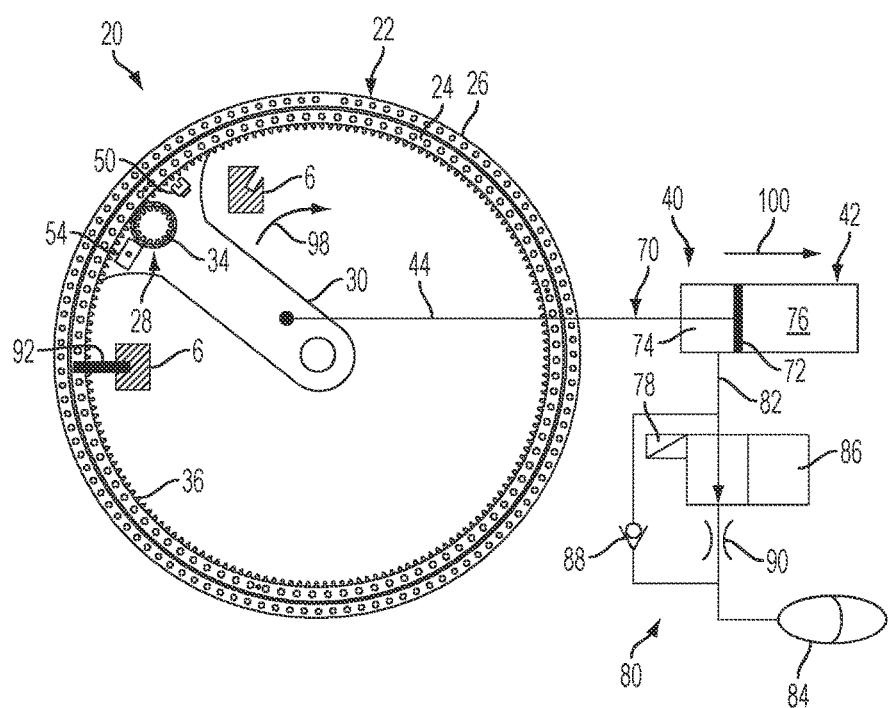

FIG. 5C illustrates the pitch system 20 after the first drive 28 has rotated the support 30, inner bearing 24, and blade to a different angular position in relation to the outer bearing ring 26 and hub 6. This position may represent the "stop" position of the blade. In other words, the blade pitch angle may be approximately 88-90°. The piston 70 has traveled a certain distance in relation to the cylinder 42 such that the second chamber 76 has expanded and is less pressurized than before. At this point the blade may be fixed relative to the hub 6 by the blade lock 92, as schematically shown in FIG. 5D. The movable lock 50 then disengages the toothed ring 36 to release the relative fixation between the support 30 and the blade. This leaves the support 30 free to move relative to the locked blade and hub.

In particular, operating the first drive 28 rotates the support 30 relative to the blade, bearing 22, and hub 6, as represented by arrow 98. The rotational motion of the support 30 causes the piston 70 to slide within the cylinder 42 (represented by arrow 100). As a result, the volume of the second chamber 76 decreases and the pressure of the gas within the second chamber 76 increases. Thus, operating the first drive 28 to move the support 30 relative to the blade and hub effectively charges the second drive 40; the second chamber 76 becomes "armed" or "re-pressurized". The control valve 88 remains open during this step so that fluid previously forced into the accumulator 84 is also drawn back into the first chamber 74.

Figure 5E:
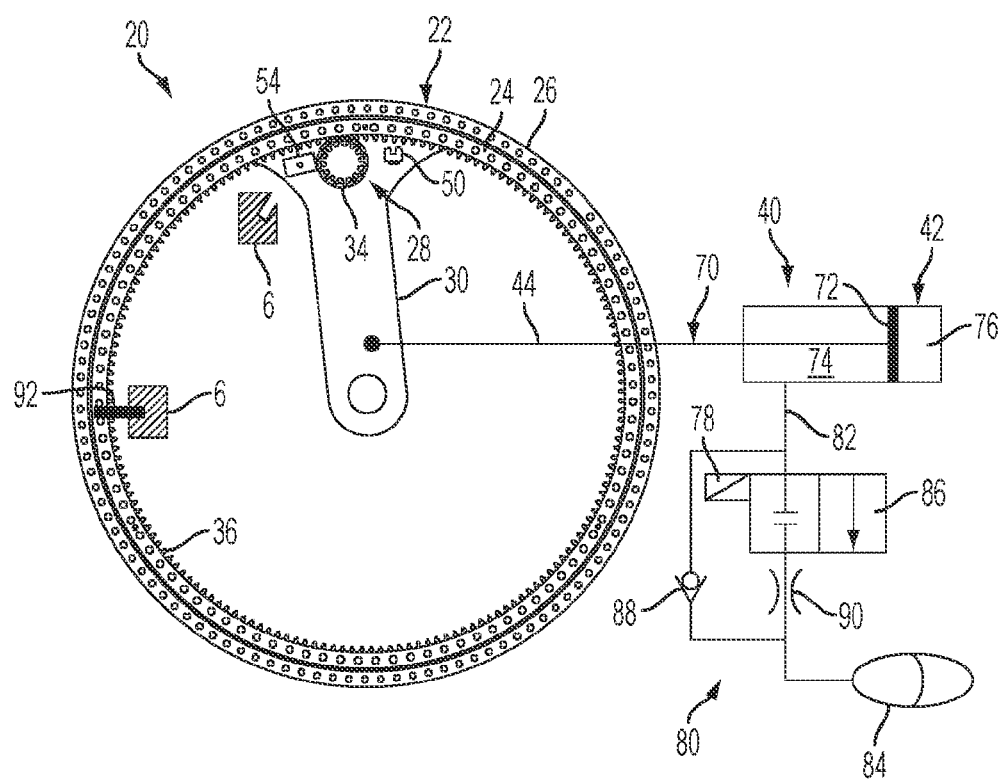

FIG. 5E illustrates the pitch system 20 after the second drive 40 has been charged back to its initial state. The blades may then be pitched with the first drive 28 by returning the pitch system 20 to the state shown in FIG. 5A. Thus, the movable lock 54 is activated to fix the support 30 relative to the hub 6. The control valve 86 is also activated, thereby preventing operation of the second drive 40. Finally, the blade lock 92 is released so that the blade is no longer fixed relative to the hub 6. This allows the first drive 28 to once again be operated to rotate the inner bearing ring 24 relative to the support 30 and thereby pitch the blade relative to the hub 6.

As can be appreciated, the second drive 40 is an internally-powered drive charged by the first drive 28, which is externally-powered. Once charged, the second drive 40 provides a reliable backup to the first drive 28. Even if power to the first drive 28 is lost, the second drive 40 may be used to bring the wind turbine to a stop to prevent damage (e.g., due to high wind speeds) and thereafter allow maintenance. The second drive 40 essentially eliminates the need for a large back-up power source for the first drive 28. Only the battery 78 is needed to activate the control valve 86 and thereby operate the second drive 40. One or more other small batteries (not shown) may be provided for the movable lock 50 and movable lock 54 if necessary or desired.

Additional safety features for the pitch system 20 may be incorporated into the design of the second drive 40. For example, the pressure of the fluid in the first and/or second chambers 74, 76 of the cylinder 42 may be monitored by a control system. When the control valve 86 is normally-open (like in the embodiment described), the battery 78 must be operable for the cylinder 42 to "hold" a charge (i.e., for first and second chambers 74, 76 to be kept pressurized). If the control system detects that the cylinder 42 is not holding a charge during the charging procedure (which occurs when the wind turbine is stopped; see discussion of FIGS. 5A-5E above), this is a sign that the battery 78 requires replacement. The pitch system 20 may then keep the wind turbine in a stopped position with the blades locked relative to the hub 6 until this replacement is performed. Thus, operation of the wind turbine without the second drive 40 being capable to serve as a back-up for the first drive 28 is prevented.

Moreover, even a failure of the battery 78 during normal operation of the wind turbine does not result in unsafe conditions. During normal operation the second drive 40 stores energy (fluid in the cylinder 42 is kept pressurized) and the first drive 28 is used to pitch the blades (see discussion of FIG. 5A above). If the battery 78 fails such that the control valve 86 is opened, the relative fixation between the support 30 and hub 6 provided by the movable lock 54 prevents the piston 70 from being driven forward. Movement does not occur until: 1) the movable lock 50 engages the toothed ring 36 to fix the support 30 relative to the blade 30, and 2) the movable lock 54 releases from the hub 6. The stored energy (pressurized fluid in second chamber 76) then pitches the blade to its stop position, as discussed above with reference to FIG. 5B. At this point maintenance may be performed to replace the battery 78.

Additional advantages may be obtained by fixing the support 30 relative to the hub 6 at different angular positions. For example, the support 30 may be initially fixed relative to the hub 6 at a first location. This may be the location shown in FIG. 5A. If the first drive 28 is operated to pitch the blade in this position, certain portions of the pinion 34 may experience greater wear because of the limited range of pitching associated with normal power production. After performing the steps described above with reference to FIGS. 5B-5D (shut-down and charging procedures), the support 30 may be fixed relative to the hub 6 at a second location. In other words, rather than the movable lock 54 once again engaging the hub 6 at the first location (the situation shown in FIG. 5E), the movable lock 54 may engage the hub 6 at a different location. The different angular position of the support 30 and first drive 28 changes the wear points on the pinion 34. That is, different portions of the pinion 34 will now be associated with the limited range of pitching during normal power production. Changing the wear points in such a manner prolongs the lifetime of the pinion 34.

A number of variations to the embodiments described above will be readily appreciated by persons skilled in the design of wind turbine pitch systems. For example, the second drive 40 may be mounted to the plate 56 instead of directly to the hub 6. Moreover, the first and second drives themselves may be different systems than as described. The first drive may be a hydraulic system, and/or the second drive may be an electrical system. Thus, although particular advantages may be obtained when the first drive comprises an electric motor and the second drive comprises a hydraulic actuator, the invention need not be limited to such an embodiment. The arrangement with the movable support 30 still facilitates incorporating the first and second drives the alternative embodiments and has general advantages. Furthermore, when the first drive is configured to charge the second drive in embodiments where the second drive is an electrical system with an internal power source (e.g., battery or capacitor), the size of the power source can be minimized.

On a more general level, the pitch system itself may be adapted to interface with wind turbine designs where the inner bearing ring 24 of the blade bearing 20 is mounted to the hub 6 and the outer bearing ring 26 is mounted to the blade 4. Examples of such designs are described in the following patent applications, the disclosures of which are incorporated herein by reference for these aspects: PCT application no. PCT/DK2011/050452 (entitled "A PITCH SYSTEM FOR A WIND TURBINE"), U.S. Provisional Patent Application No. 61/417,335 (entitled "A WIND TURBINE AND A METHOD FOR PITCHING A BLADE OF A WIND TURBINE"), and U.S. Provisional Patent Application No. 61/420,940 (entitled "MOUNTING ARRANGEMENT FOR PITCH GEAR").

With this in mind, the details of any particular embodiment mentioned above should not be seen to necessarily limit the scope of the claims below. The embodiments described are merely examples of the various claims. In addition to appreciating other modifications and variations, skilled persons will understand how features of the various embodiments may be combined in different ways.

The invention claimed is:

1. A wind turbine, comprising:
a hub;
a blade rotatably mounted to the hub; and
a pitch system including:
a support;
a first drive configured to rotate the blade relative to the support; and
a second drive configured to rotate the support relative to the hub;
wherein the support is configured to be selectively fixed relative to the blade and the hub, wherein one of the first and second drives is externally powered and comprises an electric motor, and the other of the first and second drives is internally powered and comprises a hydraulic actuator, and wherein the externally-powered drive is configured to charge the internally-powered drive.

2. The wind turbine according to claim 1, wherein the first drive comprises the electric motor and the second drive comprises the hydraulic actuator.

3. The wind turbine according to claim 2, wherein the pitch system further includes a pitch gear associated with the blade, the electric motor being mounted to the support, and the first drive further comprising a pinion driven by the electric motor and engaging the pitch gear.

4. The wind turbine according to claim 3, wherein the pitch system further includes a bearing having a first ring mounted to the blade and a second ring mounted to the hub, the pitch gear being coupled to the first ring.

5. The wind turbine according to claim 2, wherein the hydraulic actuator of the second drive comprises a cylinder and a piston slidable relative to the cylinder, the piston including a plunger dividing the cylinder into first and second chambers and a piston rod extending from the plunger, through the first chamber, and out of the cylinder.

6. The wind turbine according to claim 5, wherein the second drive further comprises a hydraulic circuit including a valve for controlling the flow of fluid into and out of first chamber of the cylinder, the valve being normally open.

7. The wind turbine according to claim 1, wherein the pitch system further includes a blade lock coupled to the blade, wherein the blade lock is configured to operatively engage the hub to prevent relative movement between the blade and the hub.

8. The wind turbine according to claim 1, wherein the pitch system further includes a hub lock mounted to the support, the hub lock being configured to operatively engage the hub to fix the support relative to the hub.

\* \* \* \* \*